United States Patent [19]

Wall

[11] Patent Number: 5,107,536
[45] Date of Patent: Apr. 21, 1992

[54] FIBER OPTIC CRIMP TERMINUS AND METHOD OF TERMINATING AN OPTICAL FIBER USING SAME

[75] Inventor: Stephen W. Wall, Costa Mesa, Calif.

[73] Assignee: Hughes Aircraft Company, Los Angeles, Calif.

[21] Appl. No.: 688,795

[22] Filed: Apr. 22, 1991

[51] Int. Cl.[5] .............................................. G02B 6/26
[52] U.S. Cl. ......................................... 385/81; 385/76; 385/78
[58] Field of Search ............... 350/96.20, 96.21, 96.22, 350/96.23; 385/60, 62, 76, 78, 81, 84, 87

[56] References Cited

U.S. PATENT DOCUMENTS

| | | | |
|---|---|---|---|
| 4,355,862 | 10/1982 | Kock | 350/96.20 |
| 4,607,911 | 8/1986 | Rhodes | 350/96.20 |
| 4,674,833 | 6/1987 | Des Forges et al. | 350/96.21 |
| 4,679,895 | 7/1987 | Huber | 385/81 |
| 4,696,537 | 9/1987 | Bauer et al. | 385/81 |
| 4,728,171 | 3/1988 | Schofield et al. | 385/81 |
| 4,787,699 | 11/1988 | Moulin | 350/96.21 |
| 4,887,875 | 12/1989 | Chang et al. | 350/96.21 |
| 4,892,378 | 1/1990 | Zajac et al. | 350/96.20 |
| 4,941,727 | 7/1990 | Maranto et al. | 350/96.20 |
| 4,964,685 | 10/1990 | Savitsky et al. | 350/96.20 |

*Primary Examiner*—Brian Healy
*Attorney, Agent, or Firm*—Terje Gudmestad; Jeannette M. Walder; Wanda K. Denson-Low

[57] ABSTRACT

An optical fiber terminus is provided in which front and rear connector bodies 15, 22 are provided, each having a bore 16, 35, 36, with a counterbore 17 being formed in the rearward end of said front connector body 15. A sleeve 40 is provided with a tapered surface 44 and slots 50, 51 through it so that one end portion of the sleeve can flex transversely. A taper 46 is formed in the counterbore 17, matching the taper of the sleeve. The sleeve 40 is positioned in the counterbore 17 and an optical fiber 13 is extended through sleeve 40 and the bores 16, 35, 36. The rear conenctor body 20 is advanced a predetermined distance into the counterbore 17, which it engages with a press fit, so that the sleeve 40 is biased forwardly to cause a reaction between the tapered surfaces 40, 46 thereby compressing one end portion of the sleeve 40 inwardly to grip and retain the optical fiber 13.

12 Claims, 1 Drawing Sheet

FIBER OPTIC CRIMP TERMINUS AND METHOD OF TERMINATING AN OPTICAL FIBER USING SAME

BACKGROUND OF THE INVENTION

1. Field of the Invention

The field of this invention is that of optical fiber connectors and in particular to the retention of an optical fiber in a terminus.

2. Description of Related Art

Optical fibers commonly are connected by pin and socket type connectors which position the ends of two optical fibers in adjacency so that light can be transmitted from one to the other. This type of connector may take a variety of forms, but will include a pin terminus having a forward end that is received within a socket at the forward end of the socket terminus to align the two connector sections. Frequently, the forward ends of the optical fibers will be in abutment in the mated connector.

In order to minimize light attenuation across the connector, it is essential that the optical fibers be firmly and securely held within the two connector sections. Minor amounts of movement of the optical fibers can result in misalignments which produce unacceptably large optical losses.

A common technique for securing the fibers in the connector bodies is to make use of an adhesive to bond the fibers in position. Although this can result in a secure attachment, it penalizes production rates because of the cure time required for the adhesive. The shelf life of the adhesive is limited which is a factor adding to the cost and complexity of production and which makes field use difficult. Adhesives can be difficult to handle.

Another means of attachment of the optical fiber is to crimp a portion of the connector body inwardly around the fiber to grip the fiber at a contracted zone. The crimping operation must be carefully controlled in order to achieve precisely the desired amount of gripping force. Even so, localized areas of excessive pressure may result which can cause minute localized bending and resulting attenuation of the light signal. Also, when the connector is subjected to temperature extremes, the crimp connection may become either too loose or too tight, again resulting in optical losses.

Another type of optical fiber connector, owned by the same assignee as that of this invention, provides a small grommet of elastomeric material near the forward end of the connector body surrounding the optical fiber. This grommet is compressed by a spring loaded plunger and is intended to grip the fiber to retain it in the connector. However, resulting retention force is relatively small that the fiber is not held as securely as it should be. Also, a spring arrangement is necessary to compensate for temperature fluctuations. This adds to the complexity and weight of the connector.

SUMMARY OF THE INVENTION

The present invention provides an optical fiber connector with an improved arrangement for retaining the fiber so that it is held securely yet losses in the light signal are minimal. The fiber retention arrangement uses no adhesives and is easily accomplished in mass production. Not only is the fiber retained securely but variations in temperature are accommodated without any auxiliary means. The overall construction is simple and economically manufactured.

The optical fiber terminus includes a front body and a rear body, each having a bore through which an optical fiber can be extended. The front connector body has a counterbore at its rearward end. Received within this counterbore is a sleeve that acts as a collet, having a forward end that is slotted and tapered. The taper of the forward end of the sleeve matches a tapered surface at the inner end of the counterbore in the front body.

The forward end of the rear connector body is introduced into the counterbore engaging the wall of the counterbore with a press fit. The rear body is advanced a predetermined distance into the counterbore so that it engages the end of the sleeve and forces the tapered sleeve surface against the tapered surface of the counterbore. This produces a reaction that compresses the slotted forward end of the collet around the optical fiber. The sleeve is deflected into firm engagement with the buffer or cladding of the optical fiber. This generates a known frictional force that securely retains the optical fiber within the terminus without creating distortion or misalignment. Efficient optical coupling can be obtained.

DESCRIPTION OF THE PREFERRED EMBODIMENTS

The optical fiber connector of this invention includes a pin terminus 11 that mates with a socket terminus 12 for interconnecting optical fibers 13 and 14.

Figure 1:
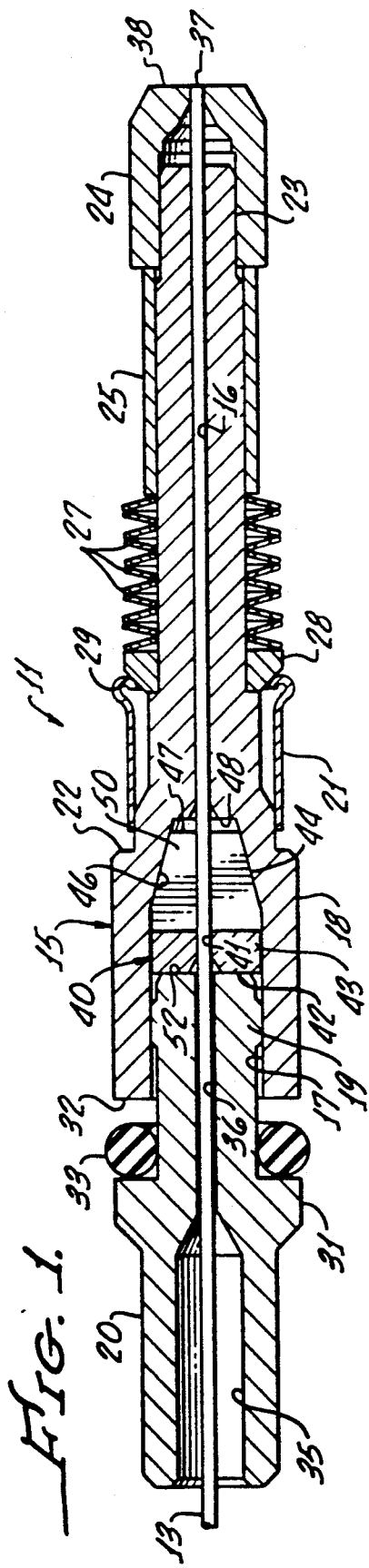
FIG. 1 is a longitudinal sectional view of a pin terminus of an optical fiber connector incorporating the invention.
Figure 3:
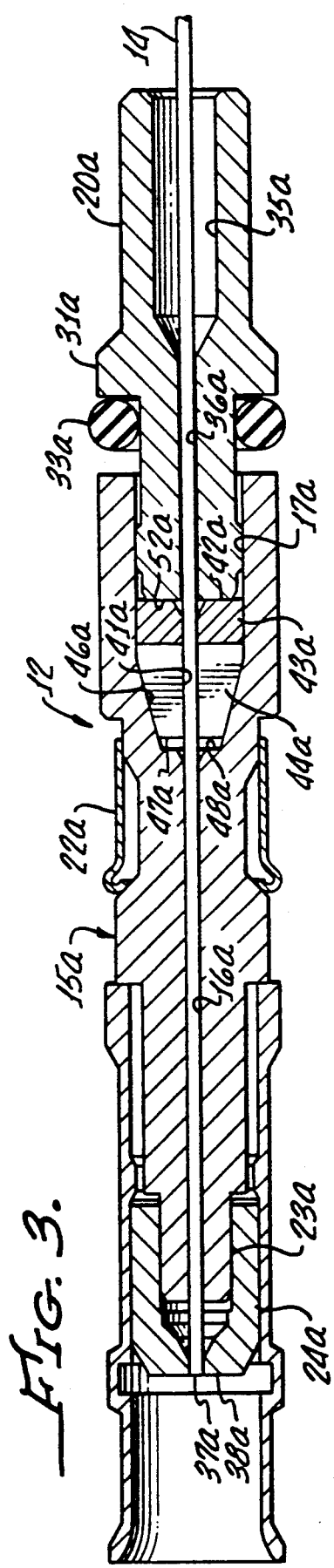
FIG. 3 is a longitudinal sectional view of a socket terminus embodying the invention.
Figure 2:
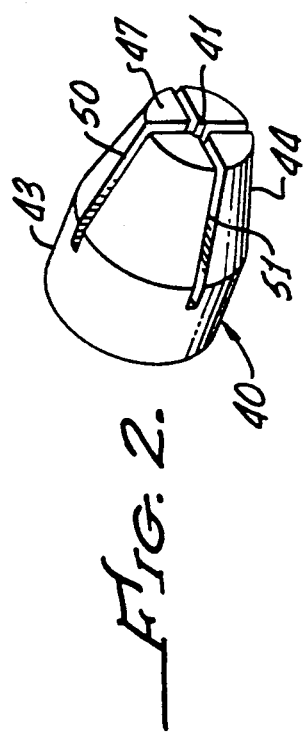
FIG. 2 is a perspective view of the retention sleeve separate from the other components of the terminus.

The pin terminus 11, as seen in FIG. 1, includes a front connector body 15 of cylindrical shape which has a cylindrical bore 16 extending through it. A cylindrical counterbore 17 is provided in the rearward end portion 18 of the front connector body, where the pin terminus 11 is enlarged and of its maximum diameter. The counterbore 17 receives the forward end portion 19 of the rear connector body 20. This is a press fit.

Exteriorly, a retainer clip 21 circumscribes the front connector body forwardly of a shoulder 22. At the forward end of the front connector body 15, the exterior surface 23 is of reduced diameter and is received with a press fit within a guide bushing 24. Rearwardly of the surface 23 is an exterior cylindrical surface 25 which is of slightly larger diameter than the surface 23 and terminates at a radial shoulder 26 near the forward end of the retainer clip 21. The surface 25 is circumscribed by a series of Belleville washers 27 which act as a spring. The rearward one of the Belleville washers 27 bears against one end of a washer 28, the opposite end of the washer engaging the shoulder 26. The outer corner 29 of that end of the washer 28 is beveled and engaged by the forward end of the retainer clip 20. A spacer sleeve 30 circumscribes the surface 25 of the front body 15 between the guide bushing 24 and the stack of Belleville washers 27. The foregoing construction is conventional.

The rear connector body 20 includes an annular enlargement 31 spaced from the rearward end 32 of the front connector body 15. This provides an annular recess that receives a seal 33.

The rear connector body 20 includes an enlarged bore section 35 that extends from its rearward end and communicates with a smaller diameter bore portion 36 that continues axially through the remainder of the rear body portion. The optical fiber 13 is received in the bores 35 and 36 of the rear body 20, and the bore and counterbore 16 and 17 of the front body. An opening 37 in the guide bushing 24 closely confines the fiber 13 at the forward end of the pin terminus 11. The end of the fiber 13 is in the same place as the flat forward end 38 of the guide bushing 24.

Received within the counterbore 17 ahead of the rear connector body 20 is a sleeve 40 which acts as a collet. The sleeve may be made of metal having some resilience. A bore 41, circular in end elevation, extends through the collet sleeve 40 and closely receives the optical fiber 13. The rearward end surface 42 of the sleeve 40 is flat and in a radial plane. The rearward portion 43 of the exterior surface of the sleeve 40 is circular in cross-section and its circumferential surface is complementary to the surface of the counterbore 17. This is a close fit but with enough clearance to allow the sleeve 40 to slide axially within the counterbore. The forward exterior surface 44 of the sleeve 40 is frustoconical, tapering toward the front end of the sleeve. The taper of the surface 44 matches the taper of a frustoconical surface 46 in the inner end of the counterbore, which extends from the cylindrical counterbore surface 17 to the bore 16. The front end 47 of the sleeve is flat and in a radial plane, and is spaced from the flat radial surface 48 that connects the tapered surface 46 to the bore 16 through the front body 15.

Two radial slots 50 and 51 which are ninety degrees apart and intersect at the longitudinal axis of the sleeve, extend axially inwardly from the front end 47 of the sleeve 40 to a location rearwardly of the juncture between the tapered surface 44 and the rearward portion 43. As a result, the front end portion of the sleeve 40 can be flexed in a radial direction.

With the optical fiber 13 extending through the rear body 20 the sleeve 40 and the front body 16, the rear body then is advanced into the counterbore 17 a predetermined distance. This movement of the rear body 20 causes its flat radial forward face 52 to bear against the rearward end 42 of the sleeve 40 and press the sleeve in a forward direction. This causes a reaction between the tapered surface 46 of the opening in the front body 15 and the tapered surface 44 of the sleeve 40. As a result, the forward end portion of the sleeve 40 is deflected radially inwardly to bear against the buffer or cladding on the optical fiber 13. This securely grips the fiber 13 to hold it securely within the pin terminus 11.

The amount of gripping force exerted against the fiber is carefully controlled by the force applied to the rear body 20 and its advancement into the counterbore 17 of the front body 15. This assures that the optical fiber 13 will be held with an adequate frictional retention force while at the same time avoiding excessive compression to assure that there is no misalignment of the fiber or damage to it. This arrangement not only firmly holds the fiber within the terminus, but also compensates automatically for temperature changes so that no auxiliary means for dealing with temperature fluctuations is necessary.

In most respects the construction of the socket terminus 12 is similar to that of the pin terminus 11. Parts corresponding to those of the pin terminus have been given the suffix "a" in reference numbers in the drawing. A major difference between the two connector sections is that in the socket terminus 12 the Belleville washers 27 and spacer sleeve 30, as well as the washer 27, are omitted. An alignment sleeve 47 is extended over the guide bushing 24a and the forward end portion of the front connector body 15a of the socket terminus. The exterior of the guide bushing 24a fits with a press fit inside the alignment sleeve 47 and the latter engages a shoulder 48 on the exterior of the front connector body 15a. In the mated connector, the guide bushing 24 of the pin terminus 11 fits within a forward socket portion 49 of the alignment sleeve 46, aligning the connector bodies and hence the two fibers 13 and 14 so that their forward end faces can abut to efficiently transmit light from one to the other.

Within the socket terminus 12 is a sleeve 40a which is identical to the sleeve 40. Hence, advancement of the rear connector body 20a into the counterbore 17a causes the forward end portion 44a of the sleeve 40a to react against the tapered surface 46a of the counterbore to radially compress that part of the sleeve. As for the pin terminus, a controlled secure gripping force is exerted against the optical fiber 14, holding it securely within socket terminus 12 without causing any misalignment of the fiber.

The foregoing detailed description is to be clearly understood as given by way of illustration and example only, the spirit and scope of this invention being limited solely by the appended claims.

What is claimed is:

1. An optical fiber terminus comprising
   a front connector body,
   a rear connector body,
   each of said connector bodies having an opening therein,
   an optical fiber received in said openings, and
   a sleeve received in said opening in said front connector body,
   said sleeve having an opening therethrough receiving said optical fiber,
   said sleeve having a tapered portion and having slot means through said tapered portion, whereby said tapered portion can flex in the radial direction,
   said opening in said front connector body including a tapered surface engaged by said tapered portion of said sleeve,
   a portion of said rear connector body being received in said opening in said front connector body and positioned such that it engages said sleeve and presses said sleeve such that said tapered portion of said sleeve reacts against said tapered surface of said opening in said front connector body, thereby to compress said tapered portion of said sleeve radially inwardly to grip said fiber with a predetermined force for retaining said fiber in said sleeve and preventing axial movement thereof relative to said connector bodies.

2. An optical fiber terminus comprising
   a front connector body,
   a rear connector body, each of said connector bodies having a forward end and a rearward end, and a bore extending between the forward and rearward ends thereof, an optical fiber received in said bores of said connector bodies, means on said front connector body for positioning said optical fiber with an end thereof adjacent said forward end of said front connector body for optical coupling with a mating optical fiber terminus, the rearward portion of said front connector body having a counterbore therein and a forwardly tapering wall at the inner end of said counterbore, a sleeve received in said counterbore, said optical fiber extending through said sleeve, said sleeve having a tapered forward surface engaging said tapered surface of said front connector body, and having slot means through the forward end portion thereof whereby said forward end portion can flex in a radial direction, and means for positioning the forward end portion of said rear connector body axially in said counterbore at a predetermined fixed location such that the forward end of said rear connector body engages the rearward end of said sleeve and said sleeve is biased forwardly such that said tapered surface of said sleeve reacts against said tapered surface of said front connector body so as to flex said forward end portion of said sleeve inwardly to grip said optical fiber and exert a predetermined retention force thereon, thereby to retain said optical fiber in said connector bodies.

3. A device as recited in claim 2 in which for said means for positioning said forward end portion of said rear connector body axially in said counterbore, said forward end portion of said rear connector body is received in said counterbore with a press fit.

4. An optical fiber terminus comprising a front connector body, a rear connector body, each of said bodies having a forward end and a rearward end, and a bore extending therethrough between the forward end and rearward end thereof, said front connector body having a counterbore in the rearward end thereof, said counterbore defining a circumferential wall and a tapered wall at the inner end of said counterbore extending from said circumferential wall to said bore, said rear connector body having a forward portion terminating in a transverse forward end wall, said forward portion being telescopingly received in said counterbore with a press fit relative to said circumferential wall of said counterbore, a sleeve in said counterbore, said sleeve having a circumferential wall adjacent the rearward end thereof and a tapered wall adjacent the forward end thereof, said tapered wall of said sleeve engaging said tapered wall of said counterbore and said circumferential wall of said sleeve being adjacent said circumferential wall of said counterbore, and an optical fiber extending through the bores of said front and rear connector bodies and through said sleeve, said forward portion of said rear connector body being positioned in said counterbore such that said forward end wall of said rear connector body engages the rearward end of said sleeve and biases said sleeve toward said inner end of said counterbore such that said tapered wall of said counterbore reacts against said tapered surface of said sleeve and flexes said forward end portion of said sleeve inwardly so that said sleeve bears against and frictionally grips said optical fiber with a predetermined force and precludes axial movement of said optical fiber relative to said front and rear connector bodies and to said sleeve.

5. A device as recited in claim 4 in which said circumferential wall of said sleeve and said circumferential wall of said counterbore are circular, transversely, and said tapered wall of said sleeve and said tapered wall of said counterbore are frustoconical.

6. A device as recited in claim 4 in which for said slot means said sleeve is provided with two slots extending radially therethrough and intersecting along the longitudinal axis of said sleeve.

7. A device as recited in claim 4 in which said forward end wall of said rear connector body is in a radial plane and said rearward end of said sleeve is in a radial plane.

8. The method of providing an optical fiber terminus and retaining an optical fiber therein comprising the steps of forming a first connector body, forming an opening in said first connector body, forming a second connector body, forming an opening in said second connector body, forming a sleeve having a tapered exterior surface adjacent one end thereof, forming at least one slot through said sleeve extending inwardly from said one end thereof whereby said one end of said sleeve can flex transversely, forming a tapered surface in said opening in said first connector body, extending an optical fiber into said openings in said first and second connector bodies and into said sleeve, and then advancing said second connector body relative to said first connector body so that second connector body engages said sleeve and biases said sleeve in a direction such that said tapered surface of said first connector body reacts against said tapered surface of said sleeve and flexes said one end of said sleeve transversely inwardly so as to engage and grip said optical fiber and prevent substantial movement of said optical fiber relative to said first connector body.

9. The method of providing an optical fiber terminus and retaining an optical fiber therein comprising the steps of forming a front connector body having a forward end and a rearward end, forming a bore through said front connector body between said forward and rearward ends thereof, forming a counterbore in the rearward end of said front connector body, forming a rear connector body having a forward end and a rearward end, with said counterbore and the forward end portion of said rear connector body being proportioned such that the forward end portion of said rear connector body can enter said counterbore with a press fit, forming a bore through said rear connector body between said forward end and rearward end thereof, forming a sleeve having a tapered surface adjacent one end thereof, forming at least one slot radially through said sleeve extending inwardly from said one end thereof, forming a tapered surface in said counterbore having the same taper as that of said tapered surface of said sleeve, positioning said sleeve in said counterbore with said tapered surface of said sleeve adjacent said tapered surface of said counterbore, extending an optical fiber through said bore in said rear connector body, said sleeve and through said bore and counterbore in said front connector body such that an end of said optical fiber is adjacent the forward end of said front connector body, and then advancing the forward end portion of said rear connector body a predetermined distance into said counterbore so as to engage said sleeve and bias said sleeve forwardly so as to cause said tapered surface of said counterbore to react against said tapered surface of said sleeve to deflect said one end portion of said sleeve radially inwardly to grip said optical fiber and preclude substantial axial movement of said optical fiber relative to said sleeve and said front and rear connector bodies.

10. The method as described in claim 9 wherein said tapered surface of said sleeve and said tapered surface of said counterbore are formed to be frustoconical.

11. The method as described in claim 9 wherein said sleeve is formed with a circumferential surface adjacent the opposite end thereof which slidably fits within said counterbore.

12. The method as described in claim 9 in which two slots are formed radially through said sleeve extending inwardly from said one end thereof, said slots being formed to intersect along the axis of said sleeve.

* * * * *